United States Patent [19]

Kruger

[11] Patent Number: 4,631,228
[45] Date of Patent: Dec. 23, 1986

[54] METHOD FOR MAKING A POROUS RIGID STRUCTURE AND THE POROUS RIGID STRUCTURE MADE THEREBY

[75] Inventor: Edmund R. Kruger, Sterling Heights, Mich.

[73] Assignee: Lear Siegler, Inc., Santa Monica, Calif.

[21] Appl. No.: 809,021

[22] Filed: Dec. 16, 1985

[51] Int. Cl.$^4$ .............................................. B32B 5/22
[52] U.S. Cl. .................................... 428/316.6; 264/123; 264/128; 264/263; 264/279; 428/323; 428/325; 428/328; 428/407
[58] Field of Search ............... 264/123, 128, 263, 279; 428/312.2, 312.6, 312.8, 316.6, 407, 408, 698, 699, 323, 325, 328

[56] References Cited

U.S. PATENT DOCUMENTS

| | | | |
|---|---|---|---|
| 3,166,615 | 1/1965 | Farrell | 264/123 |
| 3,350,178 | 10/1967 | Miller | 428/312.2 |
| 3,393,085 | 7/1968 | Howard et al. | 428/408 |
| 3,573,086 | 3/1971 | Lambdin et al. | 428/408 |
| 3,640,787 | 2/1972 | Heller | 264/123 |
| 3,823,029 | 7/1974 | Rashid | 428/408 |
| 4,228,214 | 10/1980 | Steigelman et al. | 428/327 |
| 4,299,881 | 11/1981 | Luhleich et al. | 428/698 |
| 4,442,165 | 4/1984 | Gebhardt et al. | 428/312.2 |
| 4,530,875 | 7/1985 | Donomoto et al. | 428/698 |
| 4,532,182 | 7/1985 | Short et al. | 428/698 |

Primary Examiner—William J. Van Balen
Attorney, Agent, or Firm—Reising, Ethington, Barnard, Perry & Milton

[57] ABSTRACT

The subject invention relates to a method of making a porous rigid structure for use as a mold and the porous rigid structure formed thereby. Finely divided metallic particles are coated with a composition comprising a fluid thermosetting resin dissolved in a volatile solvent. Similarly, carbide particles are coated with the same composition of fluid thermosetting resin dissolved in a volatile solvent. The coated metallic particles and the coated carbide particles are mixed together and compacted into a predetermined shape of particles. Metallic needles are coated with the same composition of fluid thermosetting resin dissolved in a volatile solvent and mixed with fibers thereby forming a substrate structure. The substrate and the predetermined shape of particles are then compacted into a integrally bonded bi-layer to form a rigid structure.

15 Claims, 4 Drawing Figures

METHOD FOR MAKING A POROUS RIGID STRUCTURE AND THE POROUS RIGID STRUCTURE MADE THEREBY

TECHNICAL FIELD

The subject invention relates to a porous rigid structure for use as a mold and a method of making same.

BACKGROUND ART

Prior art methods of forming porous rigid structures have mandated the use of particles of a uniform size. One such method is disclosed in U.S. Pat. No. 3,166,615 granted Jan. 19, 1965 in the name of J. A. Farrell. Typically, the use of particles of a uniform size requires careful monitoring of the coating process to ensure that the resin layer is likewise uniform. Variations in the resin layer surrounding the particles may result in the filling of the interstices between the particles on compacting thereby resulting in decreased porosity.

Another disadvantage associated with the prior art includes a lack of durability of the final porous rigid structure, due to the less then optimum mechanical interlock of particles of a uniformed size and spherical in configuration when compressed. Additionally, uniform size particles which do not readily interlock are subject to low tensile strength thus producing an inferior structure subject to stress cracking. Durability of the surface layer is also reduced when particles of the uniform size and spherical in configuration are used. This leads to increased wear caused by friction and greater surface vulnerability to damage during use. Premature warping of the final porous structure in use is another problem associated with the prior art. This problem may be over come by the addition of several substructure layers. However, the addition of many substructure layers substantially increases the cost of producing the porous structure.

STATEMENT OF THE INVENTION AND ADVANTAGES

The subject invention relates to a method of forming a porous rigid structure and the porous rigid structure formed thereby. Metallic particles, carbide particles, and metallic needles are coated separately with a composition comprising a fluid thermosetting resin dissolved in a volatile solvent. The coated metallic particles and the than carbide particles are mixed, and then compacted into a predetermined shape of particles. The metallic needles are combined with fibers thereby forming a substrate structure having the fibers mixed with the needles throughout. The substrate and the predetermined shape of particles are compacted into an integrally bonded bi-layer to form the rigid structure. It has been found, that combining several metals, such as aluminum, carbide and nickel, produces a structure having a greater strength and abrasion resistance than does a structure made of one metal or of particles of uniform size and geometric configuration. The use of particles having varying geometric shapes increases mechanical interlock upon compression and therefore the resulting structure is more durable. Accordingly, there is provided a method of making a porous rigid structure wherein the resulting structure has greater strength and durability than that associated with the prior art.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
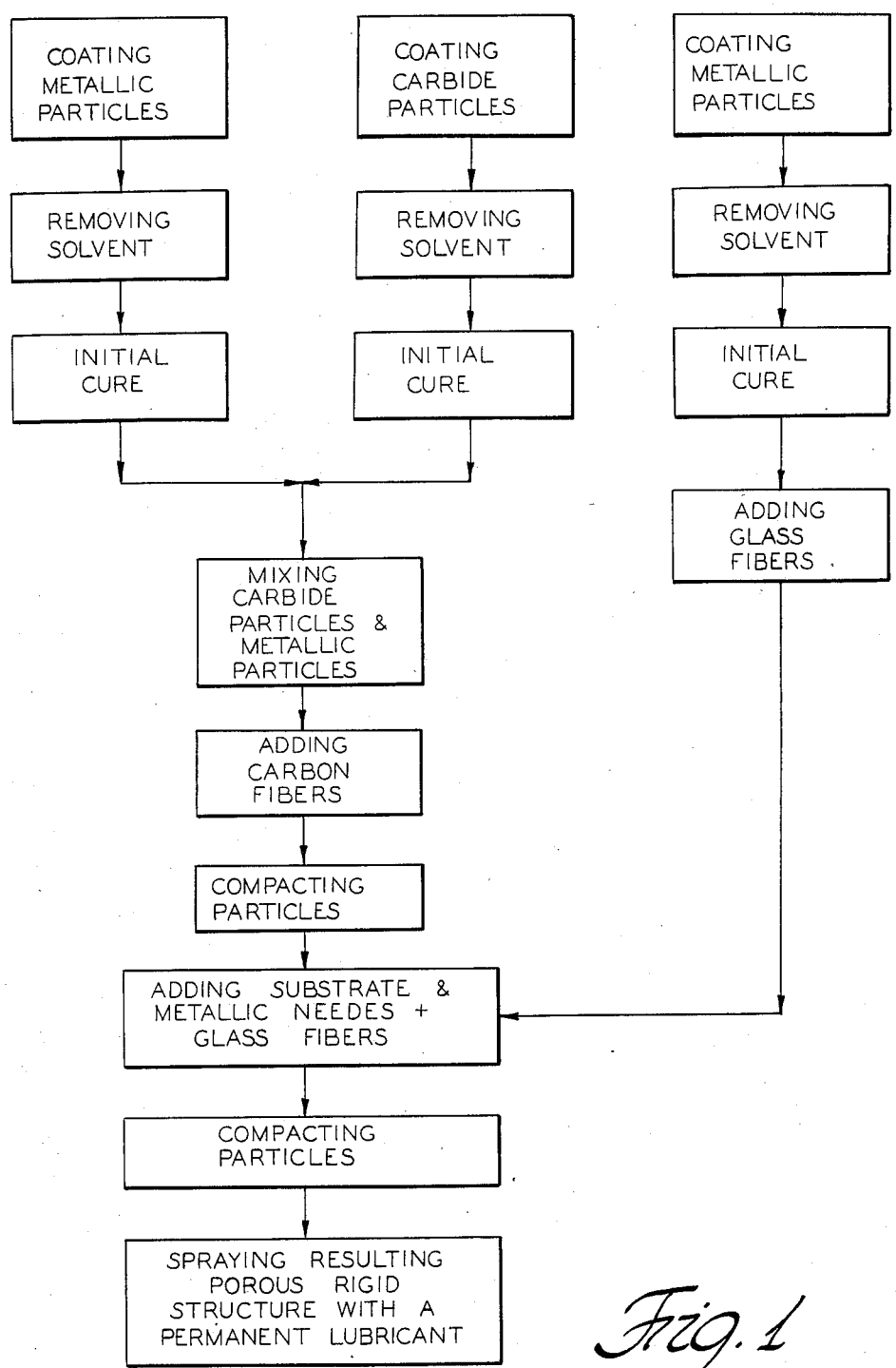
FIG. 1 is a schematic illustration of the method of forming a porous rigid structure for use as a mold.
Figure 2:
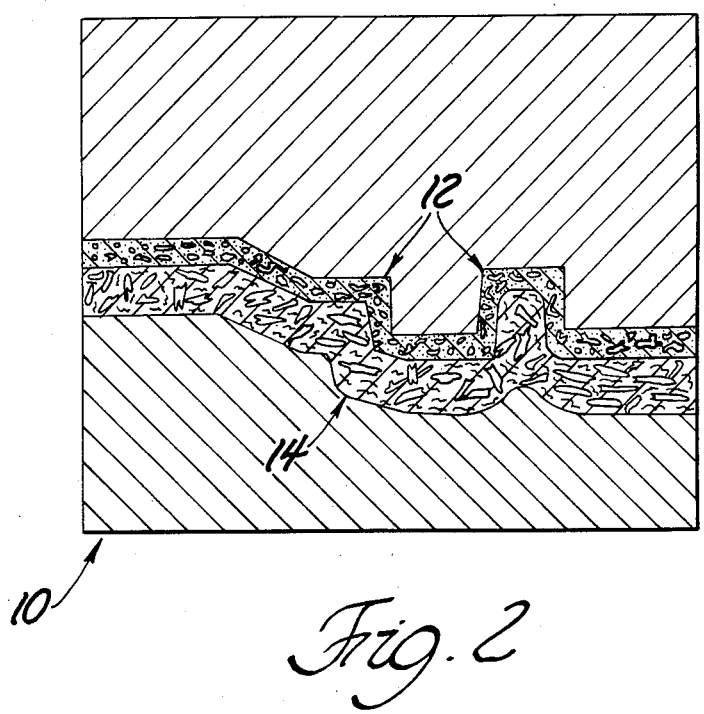
FIG. 2 is a schematic cross-sectional view showing the porous rigid structure formed by the subject method.
Figure 3:
FIG. 3 is a picture of the surface layer of the porous rigid structure shown at a magnification of 500×.

The method of forming a porous rigid structure which is the subject of the present invention is schematically shown in FIG. 1. The resulting porous rigid structure is generally shown at 10 in FIG. 2 and comprises a surface layer or mold face 12 and a substrate structure 14.

Figure 4:
FIG. 4 is a picture of the surface layer of the porous rigid structure at a magnification of 100×.

The surface layer 12 comprises carbide particles, metallic particles and in the preferred embodiment carbon fibers also. The metallic particles may be aluminum or any other finely divided metallic material having a diameter of 5 to 508 microns. The carbide particles are similar in appearance to cinders as can best be seen in FIG. 4. In the preferred embodiment the metallic particles are smaller in size than the carbide particles which have an average diameter of 44 microns. It has been found that this construction increases the durability and porosity of the resulting rigid structure.

The substrate 14 is formed from metallic needles, with 200× needles being the preferred size. Metallic needles of the 200× size resemble coarse grass seed and measure approximately 0.200 of an inch by 0.050 to 0.060 of an inch at the thickest part near the center of the needle. The fibers are preferably made of spun glass. The composition of fluid thermosetting resin dissolved in a volatile solvent can be made from a variety of resins and solvents known in the prior art. Suitable resins comprise the ethoxyline ring structure

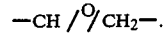

$$-\mathrm{CH}\diagup\!\!\!\!\overset{O}{\diagdown}\mathrm{CH}_2-.$$

The simplest possible resin derived from the reaction of bisphenol-A an epichlorohydrin is 2.2 bis 4-2'3' epoxypropoxy and is called the diglycidyl-ether of bisphenol-A. Other resins include epoxy resins made from a bisphenol and epichlorhydrin phenoformaldehyde resins and ureaformaldehyde resins. Curing agents are blended with said resins to achieve hardness. These curing agents include polyamines, anhydrides, and diamines. Suitable volatile solvents include methylene chloride methyl ethyl ketone and butyl glycidyl ether. The liquid thermosetting resin is dissolved in a volatile solvent in a ratio of 100% formulated resins/100% solvent to 100% formulated resin/500% solvent. The ratio of resin to solvent is dependent on the specific gravity of the particles, their weight by volume, and their size. Thus, the smaller the particle the higher the content of solvent in the composition comprising a thermosetting resin dissolved in a volatile solvent. Conversely, the larger the particles the higher the ratio of resin in the composition comprising a fluid thermosetting resin dissolved in a volatile solvent.

To form the integrally bonded bi-layer structure, the mtallic particles are placed in a first bag of liquid permeable material, the carbide particles are placed in a second bag of liquid permeable material and the metallic needles are placed in a third bag of liquid permeable material. The bags are preferably made of muslin. Each bag is immersed in the composition comprising a thermosetting resin dissolved in a volatile solvent to which is added one half to one percent saline. The addition of saline increases the tensile strength and durmeter of the resulting porous rigid structure. The bags remain submerged for 15 to 30 minutes depending upon the size of the particles. The smaller the particles, the more surface area and thus, the longer the submersion time. Conversely, the larger the particles the less time they are submerged. After this time, the bags are removed from the composition comprising a fluid thermosetting resin dissolved in a volatile solvent and placed on a blotter to dry. The drying of the particles at this time is known as the first stage cure. First stage Curing is carried out at room temperature and may be facilitated by using fans to create cross-ventilation thereby increasing the evaporation of the volatile solvent and reducing the amount of time necessary for first stage curing to occur. Once the particles are substantially dry to the touch first stage curing has been accomplished.

After the first stage curing, equal amounts of coated carbide particless and coated metallic articles are combined by mixing. Carbon fibers are then added to the combined carbide particles and metallic particles. The carbide particles constitute approximately 20% of the surface layer, the metallic particles constitute 75% and the carbon fibers comprise the remaining 5%. If carbon fibers are not used, the carbide particles constitute 20% of the surface layer and the metallic particles constitute the remaining 80% of the surface layer.

In a similar fashion, the metallic needles are allowed to initially cure and are then combined with fibers preferably formed of spun glass.

The mixture of carbide particles, metallic particles and carbon fibers are then sifted through a fine screen and placed upon a pattern or mold. The combination of particles and the pattern or mold is then placed in a vacuum bag to which a suction hose is attached. A negative pressure is created within the bag to accomplish compacting of the particles into a predetermined shape. The substrate layer is then placed in the same vacuum bag and a negative pressure is again created within the bag. To facilitate compacting, a pressure is applied to the outside of the vacuum bag. Preferably this pressure is created by the use of an air hammer. Utilization of an air hammer improves compaction of the particles thereby forming a more stable and stronger structure.

Once the particles are compacted the bag containing the predetermined shape of particles, the substrate and the pattern is heated to 125° F. During this heating, which accomplishes the secondary curing, a negative pressure is maintained in the vacuum bag. The porous rigid structure is then removed from the pattern and finally cured at 125° F. to 350° F. over an eight hour period. A permanent dichronite or Teflon lubricant is used to spray the surface of the resulting porous rigid structure. The utilization of a permanent lubricant reduces the friction associated with the use of the porous rigid structure as a mold.

The resulting porous rigid structure, comprises a mold face layer comprising carbide particles, metallic particles and carbon fibers mixed and compacted to form an upper porous surface layer. A substrate layer is integrally bonded to mold face layer and comprises metallic needles mixed with glass fibers throughout.

The invention has been described in an illustrative manner, and it is to be understood that the terminology which has been used is intended to be in the nature of words of description rather then of limitation. Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What I claim is:

1. A method of making a porous rigid structure for use as a mold comprising; coating finely divided metallic particles with a composition comprising a fluid thermosetting resin dissolved in a volatile solvent, coating carbide particles with the same composition of fluid thermosetting resin dissolved in a volatile solvent, mixing the coated metallic particles and the coated carbide particles, compacting the coated metallic particles and the coated carbide particles into a predetermined shape of particles, and coating metallic needles with the same composition of fluid thermosetting resin dissolved in a volatile solvent, mixing the coated needles with fibers and forming a substrate structure having the fibers mixed with the needles throughout, compacting the substrate structure and the predetermined shape of particles into an integrally bonded bi-layer to form the rigid structure.

2. A method as set forth in claim 1 wherein the mixing of fibers with the needles is further defined as mixing glass fibers with the needles.

3. A method as set forth in claim 2 further defined as adding one-half to one percent saline to the composition of thermosetting resin dissolved in a volatile solvent.

4. A method as set forth in claim 2 further defined as placing the metallic particles in a first bag made of liquid penetrateable material, placing the carbide particles in a second bag made of liquid penetrateable material and placing the needles in a third bag made of liquid penetrateable material, immersing each bag in the composition comprising a thermosetting resin dissolved in a volatile solvent, withdrawing the bags from the composition comprising a fluid thermosetting resin dissolved in a volatile solvent, and placing the coated particles on a liquid absorbent blotter to dry.

5. A method as set forth in claim 4 further defined as placing the materials in bags made of muslin.

6. A method as set forth in claim 1 futher defined as compacting the coated metallic particles, carbide particles, and substrate by placing the coated metallic particles, carbide particles, and substrate in a vacuum bag, attaching a hose to the vacuum bag, creating a negative pressure within the vacuum bag, and applying a force on the outside of the vacuum bag.

7. A method as set forth in claim 6 further defined as using an air hammer to exert force on the outside of the vacuum bag.

8. A method as set forth in claim 1 further defined as maintaining a negative pressure in the vacuum bag while secondary curing the porous rigid structure.

9. A method as set forth in claim 1 further defined as heating the vacuum bag containing the compacted metallic particles, carbide particles, and substrate to 125° F., removing the porous rigid structure from the bag and finally curing the porous rigid structure at 125° F. to 350° F. over an eight hour period to accomplish third stage and final curing.

10. A method as set forth in claim 1 further defined as spraying the porous rigid structure with a permanent lubricant before final cure.

11. A method as set forth in claim 10 wherein the spraying of the mold with a permanent lubricant is further defined as spraying the mold with a dichronite or Teflon lubricant.

12. A method as set forth in claim 1 further defined as adding a pop valve to the completed porous rigid structure.

13. A method as set forth in claim 1 or 2 further defined as adding carbon fibers to the coated carbide particles and the coated metallic particles and forming a layer having carbon fibers mixed with the carbide particles and metallic particles throughout.

14. A method of making a porous rigid structure for use as a mold comprising: coating metallic particles with a composition comprising a fluid thermosetting resin dissolved in a volatile solvent, coating carbide particles with the same composition of fluid thermosetting resin dissolved in a volatile solvent, mixing the the coated metallic particles and the coated carbide particles, adding carbon fibers to the combined mixture of coated carbide particles and coated metallic particles, compacting the coated metallic particles and the coated carbide particles into a predetermined shape of particles by placing the coated particles into a vacuum bag and creating a negative pressure therein, coating metallic needles with the same composition of fluid thermosetting resin dissolved in a volatile solvent, mixing the coated needles with glass fibers and forming a substrate structure having the glass fibers mixed with the needles throughout, compacting the substrate and the predetermined shape of particles into an integrally bonded bilayer to define the rigid structure, heating the vacuum bag containing the predetermined shape of particles and the substrate to 125° F., maintaining a negative pressure in the vacuum bag during heating to accomplish secondary curing, removing the compacted porous rigid structure from the pattern, heating the resulting porous rigid structure at 125° F. though 350° F. over an eight hour period, spraying the mold with said dichronite permanent lubricant, and adding a pop valve to the final porous rigid structure.

15. A porous rigid structure for use as a mold comprising; finely divided metallic particles coated with a composition of fluid thermosetting resin dissolved in a volatile solvent, carbide particles coated with said composition of fluid thermosetting resin dissolved in a volatile solvent, carbon fibers, said carbon fibers and said metallic particles and said carbide particles being mixed and compacted into a predetermined shape of particles, and characterized by a substrate structure integrally bonded to the particle layer comprising needles coated with said composition of thermosetting resin, and glass fibers, said glass fibers being mixed with said metallic needles.

* * * * *